(12) United States Patent
Metzger

(10) Patent No.: US 7,302,496 B1
(45) Date of Patent: Nov. 27, 2007

(54) ARRANGEMENT FOR DISCOVERING A LOCALIZED IP ADDRESS REALM BETWEEN TWO ENDPOINTS

(75) Inventor: Larry Raymond Metzger, Wake Forest, NC (US)

(73) Assignee: Cisco Technology, Inc., San Jose, CA (US)

(*) Notice: Subject to any disclaimer, the term of this patent is extended or adjusted under 35 U.S.C. 154(b) by 794 days.

(21) Appl. No.: 10/291,418

(22) Filed: Nov. 12, 2002

(51) Int. Cl.
G06F 15/16 (2006.01)
(52) U.S. Cl. ...................... 709/245; 370/236
(58) Field of Classification Search ............... 709/245; 370/236
See application file for complete search history.

(56) References Cited

U.S. PATENT DOCUMENTS

| | | | |
|---|---|---|---|
| 6,781,982 B1* | 8/2004 | Borella et al. | 370/352 |
| 6,865,681 B2* | 3/2005 | Nuutinen | 726/14 |
| 2002/0120760 A1* | 8/2002 | Kimchi et al. | 709/230 |
| 2002/0152325 A1* | 10/2002 | Elgebaly et al. | 709/246 |
| 2003/0007486 A1* | 1/2003 | March et al. | 370/389 |
| 2003/0009561 A1* | 1/2003 | Sollee | 709/227 |

OTHER PUBLICATIONS

Voice Over Internet Protocol (VoIP). Bur Goode. Proceedings of the IEEE, vol. 90, No. 9, Sep. 2002.*
Michael Troller. How Networks Work. Sixth Edition. Que Corporation. First Printing Oct. 2002.*
Egevang et al., "The IP Network Address Translator (NAT)," Network Working Group, Request for Comments: 1631, May 1994.
Rekhter et al., "Address Allocation for Private Internets," Network Working Group, Request for Comments: 1918, Feb. 1996.
Hain, "Architectural Implications of NAT," Network Working Group, Request for Comments: 2993, Nov. 2000.
Rosenberg et al., "STUN—Simple Traversal of UDP Through Network Address Tranlators," Internet Engineering Task Force, Internet Draft, draft-ietf-midcom-stun-03.txt, Oct. 14, 2002.
Aoun et al., "Identifying intra-realm calls and Avoiding media tromboning," MIDCOM Working Group, Internet Draft, draft-aoun-midcom-intrarealmcalls-00.txt, Feb. 2002.

* cited by examiner

Primary Examiner—Andrew Caldwell
Assistant Examiner—Grant Ford
(74) Attorney, Agent, or Firm—Leon R. Turkevich

(57) ABSTRACT

Peer-to-peer endpoint devices discover a localized IP address realm that minimizes the traversal of the Network Address Translators. Each endpoint device sends a query from its corresponding local address realm to its corresponding destination endpoint device using the corresponding available address for the destination endpoint device. The available address has a value outside the address realm of the endpoint device sending the query. The query also specifies a unique identifier that is identifiable solely by the endpoint device. The destination endpoint device receives the query, having traversed one or more NATs and at least two address realms, and sends a response that specifies the unique identifier for the query source, a unique identifier for the destination endpoint device, and multiple alias addresses for reaching the destination endpoint device. The query source selects one of the alias addresses that is determined reachable by the query source.

24 Claims, 4 Drawing Sheets

ARRANGEMENT FOR DISCOVERING A LOCALIZED IP ADDRESS REALM BETWEEN TWO ENDPOINTS

BACKGROUND OF THE INVENTION

1. Field of the Invention

The present invention relates to use of Network Address Translation (NAT) by private networks; more particularly, the present invention relates to peer-to-peer communications between Internet Protocol (IP) endpoints in a network having at least one NAT device for translating a private address realm of the network to a shared address realm.

2. Description of the Related Art

The growth of the Internet in the 1990s and 2000s has rapidly reduced the number of available public IPv4 addresses. In an effort to reduce the rate of depletion of the public IPv4 addresses, the Internet Assigned Numbers Authority (IANA) has reserved prescribed blocks of IP address space for private internets, namely 10/8 prefix (a single Class A network number), 172.16/12 prefixes (a set of 1 contiguous Class B network numbers), and 192.168/16 prefix addresses (a set of 256 contiguous Class C network numbers), the numeral following the "/" indicating the relevant number of most significant bits of the 32-bit IP address. Hence, an enterprise (i.e., an organization implementing its own IP-based private network) that utilizes these reserved blocks of IP address space can do so without any coordination or permission from the IANA or any Internet registry.

However, such private addresses are unique only within the enterprise, or set of enterprises which choose to coordinate address assignments within this address space. Hence, since these private addresses are not globally unique, the hosts (i.e., end nodes) of the private network cannot use their respective assigned private addresses within the public address realm (i.e., the Internet). Consequently, once the enterprise attempts to connect to the Internet to achieve Internet connectivity, the enterprise needs to change (i.e., renumber) the assigned IP address used by the private host during access of the public network.

Hence, network administrators have been deploying Network Address Translation (NAT) devices referred to as NATs. NATs perform a Layer-3 translation of IP-Addresses, so that public Internet addresses map to private IP addresses, as described in detail by the Request for Comments 1918 (RFC 1918), published by the Internet Engineering Task Force, available on the World Wide Web at www.ietf.org. This mapping has allowed enterprises to map a large number of private addresses to a limited number of public addresses, thus limiting the number of public addresses required by Internet users.

NAT usage has introduced many problems, most of which are well documented in RFC 2993, published by the IETF. The most basic problem introduced with the usage of NATs is the inability for peer-to-peer applications to function. Unlike client-server applications, peer-to-peer applications, for example Voice Over IP (VoIP) applications or gaming applications, function with the assumption that the basic End-to-End Model of IP routing as defined in RFC 2775 will succeed in transporting IP Packets. For example, the End-to-End Model assumes uniform addressing and transparency between endpoints, where "transparency" refers to the original Internet concept of a single universal logical addressing scheme, and the mechanisms by which packets may flow from source to destination essentially unaltered. Hence, the End-to-End Model assumes that the endpoints are the only places capable of correctly managing a data stream, and that the network should be a simple datagram service that moves bits between these points.

In particular, both peers in a peer-to-peer application need to be capable of sending IP packets directly to each other; in other words, each peer being assigned a corresponding IP address will receive IP packets generated by the other peer when that corresponding assigned IP address is specified within the destination address field of the IP packets. The use of NATs, however, affects the transparency of end-to-end connectivity for transports relying on consistency of the IP header, and for protocols which carry that address information in places other than the IP header.

A simple set of protocols have been defined that allows a peer (or both peers) in a peer-to-peer application to dynamically obtain the temporary usage of an IP address that can be used by the other peer as the destination of IP packets. This temporary IP address must be obtained from the IP address realm where the other peer also has been assigned an IP Address (via any normal assignment mechanism, including the possibility that it is also temporarily assigned with these protocols). These protocols are called Simple Traversal of UDP Through Network Address Translators (STUN) and TURN (Traversal Using Relay NAT), both of which are described in Internet drafts, see e.g., draft-ietf-midcom-stun-03.txt at the IETF website www.ietf.org.

In particular, STUN enables applications behind a NAT (i.e., served by a NAT) to discover the presence and types of NATs, and determine the public IP addresses allocated to them by the NAT. The STUN protocol utilizes a STUN client connected to the private network (i.e., behind the NAT), and a STUN server in the public Internet. The STUN client sends a binding request to the STUN server to determine the binding (i.e., address translation) utilized by the NAT; the STUN server examines the source IP address and UDP port of the request, and copies the source IP address and UDP port into a response that is sent back to the client. The STUN client can then compare the response with its own IP address to determine if it is behind a NAT.

In addition, since the STUN server is on a public Internet and the IP address and UDP port is in the body of the response, any host on the public Internet can use the pubic address to send packets to the application that sent the STUN request. The type of NAT(s) between the STUN client and STUN server will determine if the STUN client that sent the STUN request will receive the aforementioned packet as is described in the STUN Internet draft. Typically the public IP address is "published" on a server providing a Name to IP address mapping such as a SIP Proxy Server or a Domain Name Server. Thus a peering host (e.g., a Voice over IP telephony application) can locate the public IP address using prescribed query techniques, including Domain Name Server (DNS) queries.

Hence, a Name to IP address mapping service can be used by another device with access to the public Internet wishing to communicate with the STUN client. Hence, one or both of the peers will be able to obtain an interworkable address that is located in the same (shared) IP address realm beyond the NAT and used by the STUN server, where the interworkable addresses are routable using the End-to-End Model of IP.

A substantial disadvantage of using these interworkable addresses in the shared address realm, beyond utilizing a STUN server, is the requirement for IP packets flowing between the peer to always traverse the same shared IP address realm beyond the NAT. Hence, the IP packets may need to traverse multiple layers of NATs in order to reach the shared IP Address Realm having a STUN server reachable by both peers. Consequently, the peer-to-peer traffic between the endpoints are subject to the constraints and limitations of each NAT traversed by the peer-to-peer traffic. Such constraints and limitations may be substantial for NATs implemented using dial-up connections, or NATs burdened by limited processing resources or additional network processing requirements (e.g., executing firewall operations, etc.). Moreover, even if the two endpoints are within the same private network, the topology of the private network may prevent existing discovery resources from discovering that both endpoints are within the same address realm, requiring the two endpoints to rely on the STUN servers in the public address realm via the NAT.

SUMMARY OF THE INVENTION

There is a need for an arrangement that enables endpoints of a peer-to-peer application to discover an optimal shared address realm that minimizes the number of Network Address Translators that must be traversed for peer-to-peer communications.

There also is a need for an arrangement for endpoints of a peer-to-peer application to discover an optimal shared address realm using a secure protocol that ensures that data flows, between the endpoints, cannot be redirected and terminated by an unintended network device.

There also is a need for an arrangement that enables network endpoints within a private network, having a Network Address Translator for access by the network endpoints to a public network, to discover each other's presence within the private network.

There also is a need for optimized use of intra-private network communications and minimized use of public network communications, without the necessity of network-based discovery resources.

These and other needs are attained by the present invention, where peer-to-peer endpoint devices utilize client-server interaction between each other to discover a localized IP address realm that minimizes the traversal of the Network Address Translators. Each endpoint device sends a query from its corresponding local address realm to its corresponding destination endpoint device using the corresponding available address for the destination endpoint device, obtained for example by a DNS query, or a VoIP call setup via a call management service. The query also specifies a unique identifier that is identifiable solely by the endpoint device. If the available address specified by the query has a value outside the address realm of the endpoint device sending the query, then the query traverses one or more NATs and at least two address realms to reach the destination endpoint. The destination endpoint device responds to the query by sending a response that specifies the unique identifier for the query source, a unique identifier for the destination endpoint device, and multiple alias addresses for reaching the destination endpoint device. The query source selects the one of the alias addresses that is determined reachable by the query source.

Hence, endpoint devices can automatically discover a localized IP address realm between each other based on exchanging multiple alias addresses. Use of the unique identifiers ensure security between the two endpoint devices, and the selection of an alias address enables the endpoint devices to select from multiple address realms that may be present among nested Network Address Translation devices.

One aspect of the present invention provides a method in an endpoint device having a first network address for use in a first address realm of a local network, the local network including a network address translator configured for converting the first network address to a second address for a second address realm. The method includes sending a query to a destination endpoint device using an available address for the destination endpoint device having a value outside the first address realm. The query specifies a first unique identifier identifiable solely by the endpoint device. The method also includes receiving a response from the destination endpoint device that includes the first unique identifier, a second unique identifier used for responding to the destination endpoint device, and alias addresses for the destination endpoint device. The alias addresses include at least the available address for the destination endpoint device and an alternate address. The method also includes using one of the alias addresses for communicating with the destination endpoint device.

Another aspect of the present invention includes a method in an endpoint device having a first network address for use in a first address realm of a local network, the local network including a network address translator configured for converting the first network address to a second address for a second address realm. The method includes determining alias addresses used by the respective address realms for identifying the endpoint device, including at least the first network address and the second address. The method also includes receiving a query from a source endpoint device. The query specifies a first unique identifier used for responding to the source endpoint device. The method also includes outputting a response to the source endpoint device that specifies the first unique identifier, a second unique identifier identifiable solely by the endpoint device, and the alias addresses usable for reaching the endpoint device via the respective address realms. The response enables the source endpoint device to use one of the alias addresses for communicating with the endpoint device.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
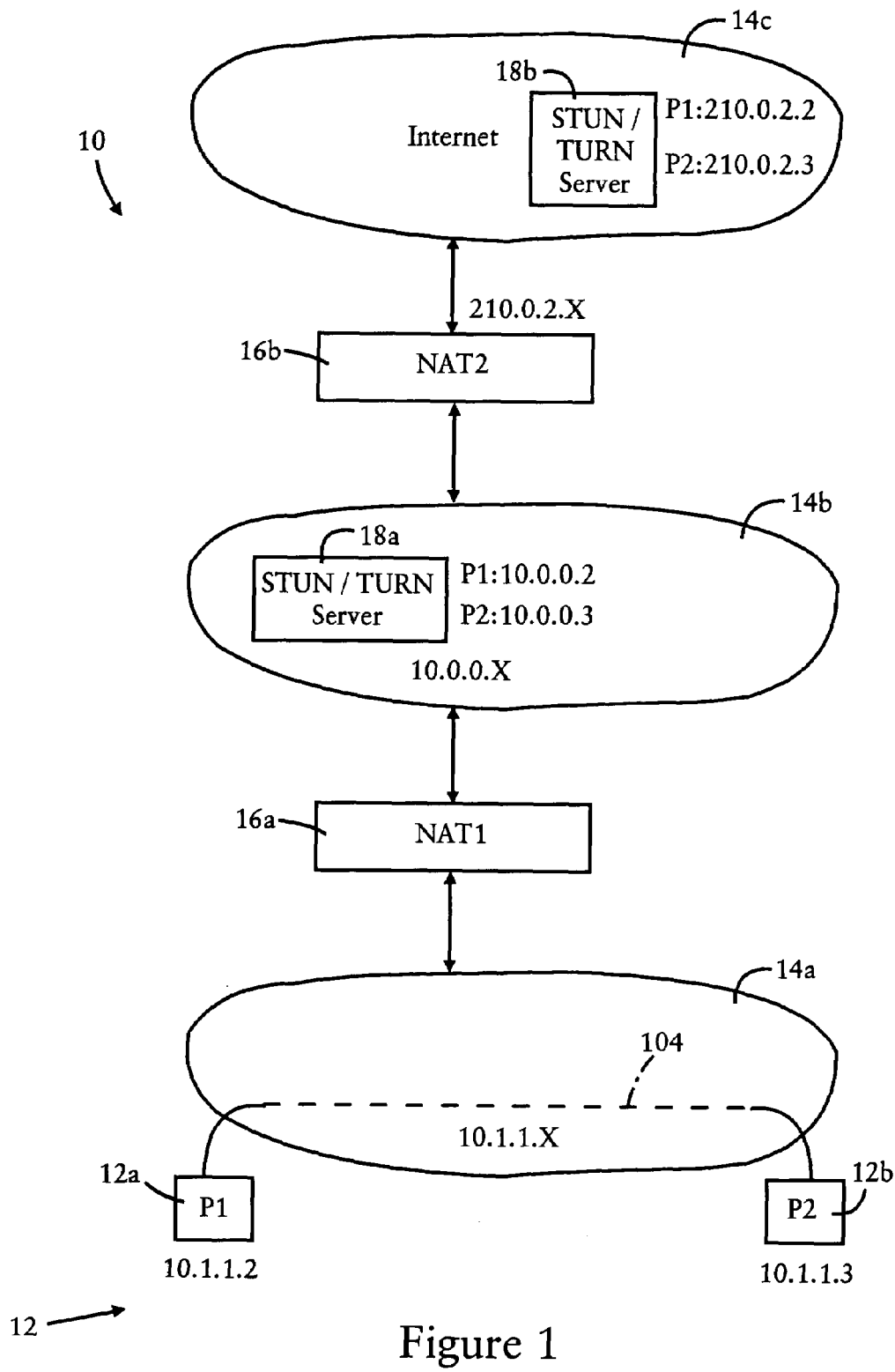
FIG. 1 is a diagram illustrating optimal address realm selection by endpoints in a private network topology, according to an embodiment of the present invention.

FIG. 1 is a diagram illustrating optimal address realm selection by endpoints in a network topology, according to an embodiment of the present invention. The network topology 10 includes a private IP network 14*a* having its own assigned private address realm, for example "10.1.1.x", where the symbol "x" refers to an address range between and including 0 and 255. The network topology also includes a second network 14b having its own distinct private address realm, illustrated as "10.0.0.x". If desired, the private network 14b may be connected to a public network 14c, such as the Internet, that complies with the public IPv4 address assignment established by the IANA. As illustrated in FIG. 1, the endpoints 12a ("P1") and 12b ("P2") are assigned a local address "10.1.1.2" and "10.1.1.3" through a normal IP Address assignment mechanism, for example DHCP.

The networks 14a, 14b, and 14c communicate via NATs 16a and 16b that perform address translation between the respective address realms. For example, the NAT 16a (NAT1) performs address translation between the address realm of the network 14a (10.1.1.x) and the address realm of the network 14b (10.0.0.x) using translated addresses that are temporarily assigned by the NAT 16a. For example, the local IP address 10.1.1.2 of the endpoint 12a ("P1") within the address realm of the private network 14a is translated by the NAT 16a to a translated value of 10.0.0.2 for transport in the private network 14b; hence, if the NAT 16a receives an IP packet containing an IP header and a datagram from the endpoint 12a, the NAT 16a replaces the address "10.1.1.2" from the source address field of the IP header with the translated address "10.0.0.2". Conversely, if the NAT 16a receives an IP packet from the private network 14b specifying the destination address of "10.0.0.2", the NAT 16a replaces the destination address with the local address "10.1.1.2" of the endpoint 12a. Similar translation is performed by the NAT 16a for IP packets to/from the endpoint 12b, which translates between the address "10.1.1.3" and "10.0.0.3" for packets traversing between the endpoint 12b and the private network 14b.

If the private network 14b is connected to a public network 14c such as the Internet, the private network 14b will include a NAT 16b for translating addresses between the private address realm of the private network 14b (10.0.0.x) and a prescribed addressable range (e.g., 210.0.2.x) in compliance with the IANA.

The networks 14b and 14c include respective STUN/TURN servers 18a and 18b that enable the endpoint devices to determine the translated addresses. In particular, the endpoints 12a and 12b use the STUN/TURN server 18a to obtain respective addresses 10.0.0.2 and 10.0.0.3 from the shared IP address realm (10.0.0.x) of 14b. Note that the NAT 16a, and likewise by the NAT 16b, could assign translation addresses dynamically or statically, or via any algorithmic means available for implementation of the NATs. Also note that the respective addresses assigned to the endpoint 12a ("P1") and the endpoint 12b ("P2") are in accordance with existing IP based protocols.

Hence, according to existing protocols, each IP packet sent from the endpoint 12a ("P1") to endpoint 12b ("P2") will have a source IP address 10.1.1.2, and a destination IP address 10.0.0.3; the IP packet traverses the NAT device 16a prior to being translated to the destination 10.1.1.3 for delivery to the endpoint 12b via the private network 14a. Similarly, each IP packet sent from the endpoint 12b ("P2") to endpoint 12a ("P1") will have a source address 10.1.1.3 and a destination address 10.0.0.2; the IP packet traverses the NAT device 16a prior to being translated to the destination 10.1.1.2 for delivery to the endpoint 12a via the private network 14.

According to the disclosed embodiment, the endpoints 12a and 12b operate according to a client-server model to determine their assigned IP addresses in different address realms, in accordance with the STUN/TURN protocol. For example, the endpoint 12a determines its assigned IP address 10.0.0.2 within the shared address realm 14b based on sending a query to the STUN/TURN server 18a; the endpoint 12a also determines its assigned IP address 210.0.2.2 (assigned by the NAT device 16b) in the public address realm 14c based on sending a query to the STUN/TURN server 18b. Similarly, the endpoint 12b determines its IP assigned addresses 10.0.0.3 and 210.0.2.3 for the address realms 14b and 14c based on sending queries to the STUN/TURN servers 18a and 18b, respectively. Once an endpoint has determined the assigned IP addresses used by respective address realms, also referred to as alias addresses, the endpoint can supply the shared IP address to the peer endpoint 12, for example according to SIP protocol as described in RFC 2543, published by the IETF. Moreover, as described below with respect to FIGS. 2, 3A and 3B, the endpoint devices 12 discover a localized IP address realm that optimizes localized communications via a local path 104, minimizing the necessity for traversal of the NATs 16b and/or 16a.

Figure 2:
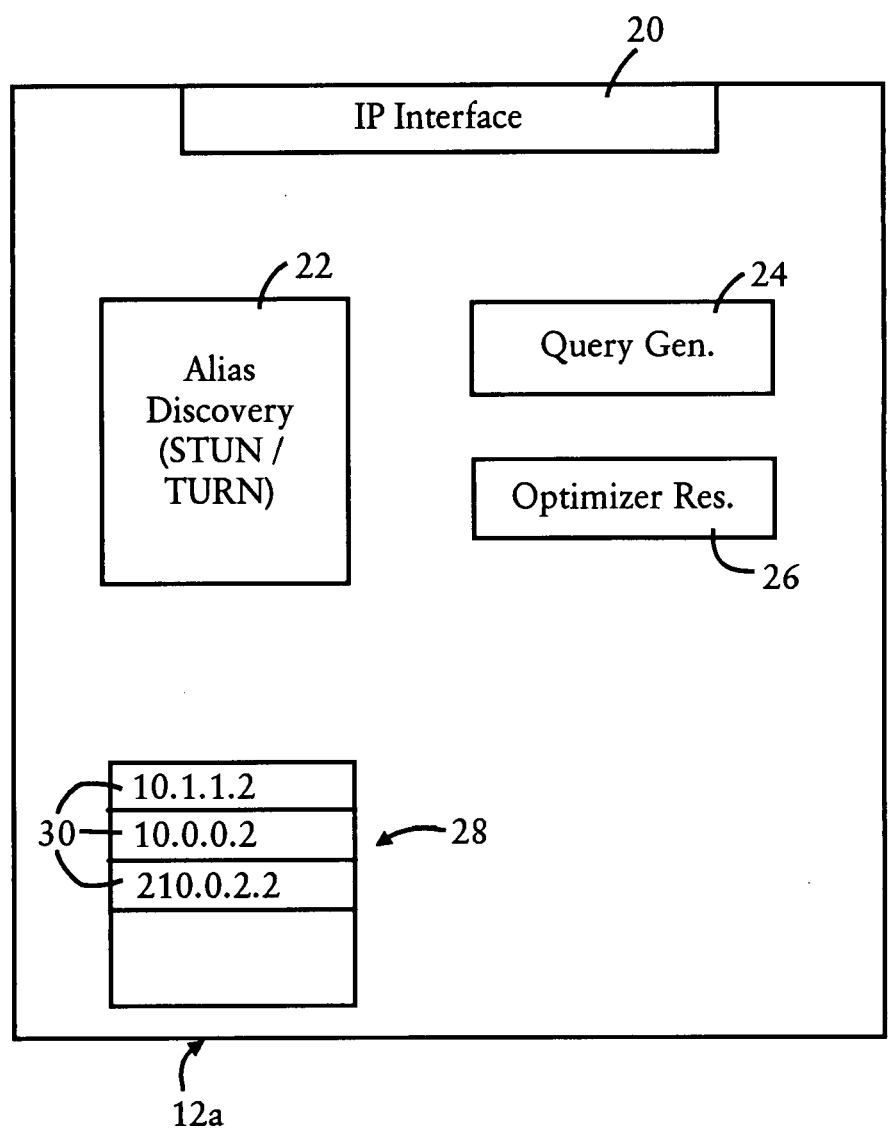
FIG. 2 is a diagram illustrating one of the endpoints of FIG. 1.

FIG. 2 is a diagram illustrating in detail the IP based endpoint 12 (e.g., the endpoint 12a), according to an embodiment of the present invention. The endpoint 12a includes an IP interface 20, a discovery resource 22, a query generation resource 24, an optimizer resource 26, and an alias table 28 configured for storing alias addresses 30. The IP interface 20 is configured for outputting queries and receiving responses, according to Internet Protocol, and is assigned the local IP address "10.1.1.2". The discovery resource 22 is configured for determining the alias addresses used by the respective address realms for identifying the endpoint device 12a, for example according to STUN/TURN protocol. Note that an IP endpoint could have multiple aliases in the same address realm, for example one alias could be located physically on the NAT and returned via STUN protocol, and a second alias on a TURN server could be returned via TURN protocol. The discovery resource 22 stores the identified alias addresses as entries 30 in the alias list 28, enabling the endpoint 12a to supply the list of alias addresses in response to queries, described below. The assigned local IP address ("10.1.1.2") typically is assigned the highest preference alias address, hence is stored at the top of the list 28. The next preference alias address ("10.0.0.2") requiring traversal of only one NAT 16a would then be stored, followed by the next preference alias address ("210.0.2.2") requiring traversal of NATs 16a and 16b. Similarly, the alias list 28 would be implemented in the endpoint device 12b to include the corresponding highest order alias address "10.1.1.3" representing the most preferred IP address for optimized local communications; the next alias address "10.0.0.3" would be stored after the highest order alias address to represent the next preferred IP address requiring traversal of the NAT device 16a; and the alias address "210.0.2.3", representing the less preferred IP address that requires traversal of the NAT device 16a and the NAT device 16b, would be stored following the alias address "10.0.0.3". Once the endpoint 12a has supplied its shared IP address to its peer 12b, for example using a signaling protocol such as SIP (RFC 2543), the peer endpoint devices 12a and 12b could begin transporting UDP messages via the shared IP addresses via the NAT 16a. As described below, however, each endpoint 12 utilizes the query generation resource 24 and optimizer resource 26 to discover a localized IP address realm that minimizes the use of NATs 16.

As described below with respect to FIGS. 3A and 3B, once an endpoint device (e.g., 12a) obtains an available address (e.g., the shared address supplied according to SIP protocol) for the corresponding peer endpoint device (e.g., 12b), the query generation resource 24 of the endpoint device (e.g., 12a) is configured for sending a query to the destination endpoint device (e.g., 12b) using the available address, in order to determine the presence of alternate alias addresses that may be used for peer-to-peer communications with the destination endpoint device. Further, each endpoint device 12 of the peer-to-peer communications performs the same query routine of FIGS. 3A and 3B, such that both endpoint devices 12 perform the client-server based discovery routines to determine the optimum address path 104.

Figure 3A:
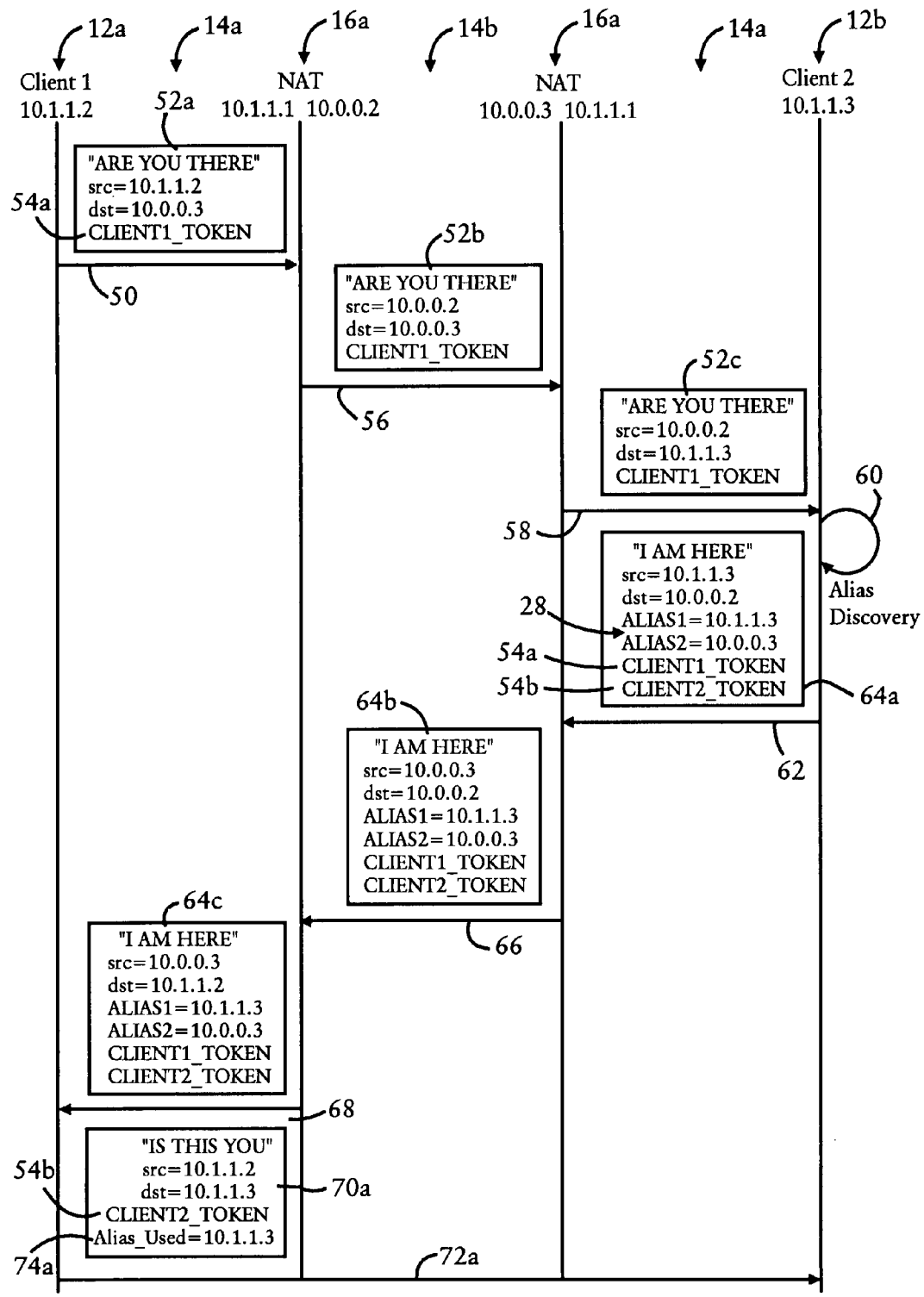
FIGS. 3A and 3B are diagrams summarizing the method of selecting an optimal address realm by the endpoints of FIG. 1, according to an embodiment of the present invention.
Figure 3B:
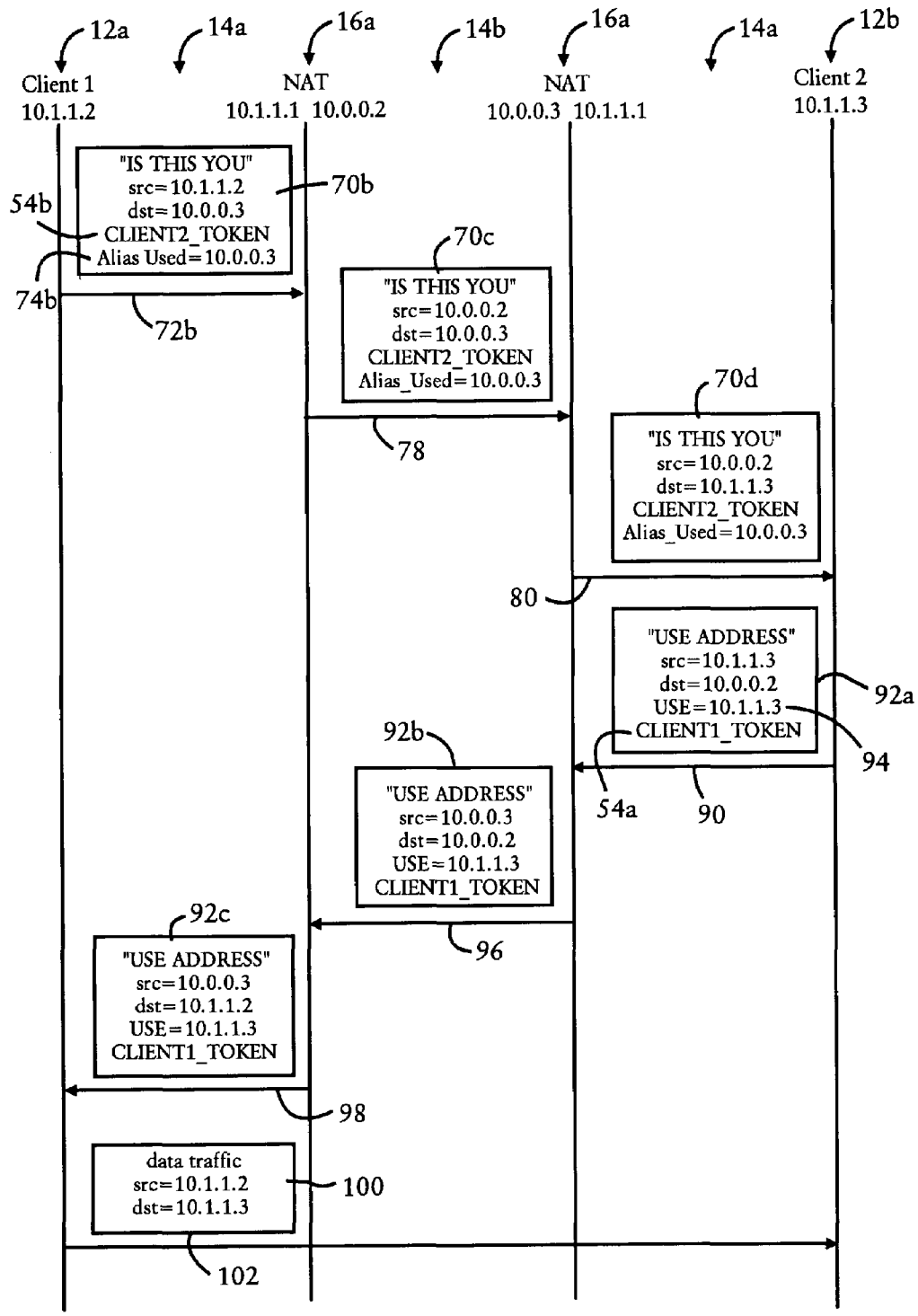

FIGS. 3A and 3B are diagrams illustrating the method in each endpoint 12a and 12b of discovering a localized address realm for establishment of peer-to-peer communications within the local address realm, according to an embodiment of the present invention. The steps described in FIGS. 3A and 3B can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The methods described in FIGS. 3A and 3B are performed by both endpoints 12a and 12b of the peer-to-peer application. For simplicity, the operations will be described from the perspective of the endpoint 12a ("P1") acting as the requester ("client 1"), and the endpoint 12b ("P2") acting as the responder ("client 2"); however, the endpoint 12b will also perform the same operations of FIGS. 3A and 3B to determine the optimum alias address, as described below.

The method begins in step 50, where the query generation resource 24 of the endpoint device 12a outputs a query message 52a to the destination endpoint device 12b using the available address "dst=10.0.0.3" as the IP destination address; as described earlier, the available address is obtained according to, for example, SIP protocol. The query message 52a, also referred to as an "ARE YOU THERE" message, specifies the local IP address "10.1.1.2" of the endpoint 12a as the IP source address, the available address "10.0.0.3" of the destination endpoint device 12b as the IP destination address, and a unique identifier 54a ("CLIENT1_TOKEN"). The unique identifier 54a uniquely identifies resource endpoint device 12a. In particular, the unique identifier 54a, which may be implemented for example as the local IP address, a secure key generated by the query generation resource 24, or a private reference (i.e., pointer) to a private key known only by the endpoint devices 12a and 12b, is used as a private key that can only be decoded by the originator 12a; hence, only the source endpoint device 12a is able to decode its own unique identifier 54a, enabling the source endpoint device 12a to validate any received reply based on the reply including the corresponding unique identifier 54a.

The endpoint device 12a outputs the query message 52a in step 50 onto the private network 14a. The query message 52a is routed to the NAT device 16a at IP address 10.1.1.1 within the address realm 14a. The NAT device 16a translates the source address of the query message 52a to the translated address "10.0.0.2" for the address realm of the second network 14b, and outputs in step 56 the query message 52b onto the second network 14b. The query message 52b is routed by the network 14b back to the NAT device 16a as the destination for the address 10.0.0.3, which outputs in step 58 the query message 52c having the translated destination address "10.1.1.3" that corresponds to the local IP address of the destination endpoint 12b device.

The IP interface 20 of the destination endpoint device 12b, in response to receiving the query message 52c, supplies the query to the optimizer resource 26. The optimizer resource 26 is configured for accessing the alias list 28 in step 60, and outputting in step 62 a response 64a ("I AM HERE") to the source endpoint device 12a. The response 64a specifies the local address "10.1.1.3" as the source IP address, the available source address 10.0.0.2 from the query 52c as the destination address, the alias list 28, the unique identifier 54a for the source endpoint device 12a, and a unique identifier 54b ("CLIENT2_TOKEN") for the destination endpoint device 12b.

As described above, the alias list 28 includes the list of the alias addresses: the list 28 of alias addresses may be arranged in a preference order based on a determined network topology of the respective address realms. However, the list 28 of alias addresses specified in the response 64a need not necessarily be arranged in the preference order stored in the destination endpoint device 12b, unless it is desirable for the source endpoint device 12a to select the optimized address without verification of the optimized address by the destination endpoint device, described below. In addition, the list 28 of alias address could specify more than one alias for a given address realm, for example a STUN-based alias address and a TURN-based alias address.

The response 64a is routed by the private network 14a to the NAT device 16a having the IP address 10.1.1.1, which outputs in step 66 the response 64b having the translated IP source address 10.0.0.3 of the destination endpoint device 12b. The response 64b is routed back by the network 14b to the NAT 16a, which outputs in step 68 the response 64c having the translated destination address 10.1.1.2 for delivery by the local address realm 14a to the source endpoint device 12a.

The optimizer resource 26 of the source endpoint device 12a, in response to receiving the response 64c having the alias list 28, sends a second group of query messages 70a, 70b ("IS THIS YOU") to each of the destination addresses specified in the alias list 28. In particular, the optimizer resource 26 outputs in step 72a the query message 70a to the destination endpoint device 12b by using the most preferred (i.e. local) destination address 10.1.1.3. Referring to FIG. 3B, the optimizer resource 26 outputs in step 72b the query message 70b to the destination endpoint device 12b by using the next preferred address 10.0.0.3 as the destination address.

The optimizer resource 26 also inserts with in each query message a corresponding alias used identifier (e.g., 74a) that specifies the corresponding alias being used as the destination IP address, enabling the destination endpoint device 12b to determine which alias was used, regardless of address translation by the NAT 16a. Hence, the alias identifier 74a specifies that the source endpoint device 12a sent the query message 70a in step 72a to the destination IP address "10.1.1.3"; the alias identifier 74b specifies that the source endpoint device 12a sent the query message 70b in step 72b to the destination IP address "10.0.0.3". Each query message 70a, 70b also includes the unique identifier 54b for the destination endpoint device 12b for validation.

As illustrated in FIG. 3B, the NAT device 16a outputs the query message 70c in step 78 having the translated source address 10.0.0.2. The address realm 14b routes the query message 70c to the NAT 16a, which outputs the query message 70d in step 80 having the translated destination address 10.1.1.3.

Hence, the destination endpoint device 12*b*, in response to receiving the "IS THIS YOU" query messages 70*a* and 70*b*, is able to determine from the respective alias used identifiers 74*a* and 74*b* the IP addresses used by the source endpoint device 12*a*. In addition, the optimizer resource 26 within the destination endpoint device 12*b* is able to validate each of the queries 70*a* and 70*b* as having been based on the data originally sent by the destination endpoint device 12*b*, based on detecting its own token 54*b* within each of the received messages.

The optimizer resource 26 of the destination endpoint device 12*b*, in response to receiving the query messages 70*a* and 70*b*, validates the messages based on the received tokens 54*b*, and selects from the alias used identifiers 74*a* and 74*b* the preferred alias addresses to be used by the source endpoint device 12*a* for subsequent peer-to-peer communications. As described above, the optimizer resource 26 selects the address to be used based on its relative position within the locally-stored alias list 28, to minimize the number of NAT devices that need to be traversed. Other selection criteria may be utilized for determining the address to be used, for example latency considerations, or other criteria.

The optimizer resource 26 outputs in step 90 a reply message 92*a* that includes the unique identifier token 54*a* for the source endpoint device 12*a*, and a use identifier 94 that specifies the IP address to be used by the source endpoint device for peer-to-peer communications. The NAT device 16*a* translates the source address for the address realm 14*b*, and outputs the reply message 92*b* in step 96. The address realm 14*b* routes the reply message 92*b* to the NAT device 16*a*, which translates the destination address and outputs in step 98 the reply message 92*c* to the address realm 14*a* for delivery to the source endpoint device 12*a*.

The optimizer resource 26 of the source endpoint device 12*a*, in response to validating the token 54*a* and detecting the use identifier 94, can therefore select the optimized local address for communications of datagrams 100 in step 102 via the localized communication path 104, illustrated in FIG. 1, eliminating the necessity of traversing the NAT 16*a*.

According to the disclosed embodiment, IP endpoints in a network can exchange alias address information, with unique identifiers that serve as validation keys, in order to discover a localized IP address realm for peer-to-peer communications, enabling NAT devices to be bypassed without the necessity of network management.

According to the disclosed embodiment, the IP endpoints can exchange alias address information to discover a localized IP address realm, regardless of whether the NATs 16*a* and 16*b* are implemented as single-ended NATs or double-ended NATs. In particular, the messages (e.g., 52*c*, 64*c*, 70*d*, 92*c*) sent to a device by a single-ended NAT have a source address specifying the peer's address outside the NAT (i.e., from a different address realm) (e.g., message 52*c* specifies a source address "10.0.0.2"). In contrast, messages sent to a device by a double-ended NAT can have a source address specifying the NAT itself (e.g., "10.1.1.1" for messages 52*c*, 64*c*, 70*d*, 92*c*); consequently reply messages (e.g., 64*a*, 70*b*, and 92*a*) would have a destination address specifying the NAT. Hence, the disclosed embodiment can be used with double-ended NATs.

Although the disclosed embodiment has been described with respect to NAT devices, the disclosed embodiment is equally applicable to NAPT (PAT) devices. Also note that the disclosed embodiment may be used to discover a localized IP address realm between endpoint in different address realms; hence, an endpoint in the address realm 14*a* may discover an endpoint in the address realm 14*b*, eliminating the necessity of traversing the second NAT 16*b*.

The disclosed embodiment also is beneficial for nomadic IP devices with applications that use control protocols to exchange IP addresses/ports for the purpose of setting up other communication channels (e.g., FTP, SIP, H.323, etc.). In addition, the disclosed embodiment may be used by endpoint devices that perform independent selection of the alias addresses upon receipt of the query response, in accordance with Stream Control Transmission Protocol (SCTP) as specified by the IETF Request for Comments (RFC) 2960

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an endpoint device having a first Internet Protocol (IP) network address for use in a first IP address realm of a local IP network, the local IP network including a network address translator configured for converting the first IP network address to a second IP address for a second IP address realm, the method including:

sending a query by the endpoint device to a destination endpoint device, the query having an IP source address field specifying the first IP network address and an IP destination address field specifying an available IP address for the destination endpoint device having a value outside the first IP address realm, the sending including specifying, within the query, a first unique identifier identifiable solely by the endpoint device for validating any received reply to the query;

receiving by the endpoint device a response from the destination endpoint device that specifies the first unique identifier, a second unique identifier used for responding to the destination endpoint device, and alias IP addresses for reaching the destination endpoint device via the respective IP address realms, the alias IP addresses including at least the available IP address for the destination endpoint device and an alternate IP address;

using by the endpoint device one of the alias IP addresses for communicating with the destination endpoint device via the corresponding IP address realm, including inserting the one alias IP address in the corresponding IP destination address field of each IP datagram destined for the destination endpoint device; and sending a second query for each of the alias IP addresses, each second query including the second unique identifier, the using of the one alias IP address including selecting the one alias IP address based on receiving a reply specifying, by the destination endpoint device, preferred use of the one alias IP address relative to the alias IP addresses specified in the respective second queries received by the destination endpoint device.

2. The method of claim 1, wherein using of the one alias IP address further includes validating the reply based on detecting the first unique identifier.

3. The method of claim 1, wherein the second query sending includes inserting, within each second query, an alias used identifier that specifies the corresponding alias IP address being queried as a candidate destination.

4. A method in an endpoint device having a first Internet Protocol (IP) network address for use in a first IP address realm of a local IP network, the local IP network including a network address translator configured for converting the first IP network address to a second IP address for a second IP address realm, the method including:

determining by the endpoint device alias IP addresses used by the respective IP address realms for identifying the endpoint device, including at least the first IP network address and the second IP address;

receiving by the endpoint device a query from a source endpoint device, the query specifying a first unique identifier used for responding to the source endpoint device;

outputting by the endpoint device a response to the source endpoint device that specifies the first unique identifier, a second unique identifier identifiable solely by the endpoint device, and the alias IP addresses usable for reaching the endpoint device via the respective IP address realms, the response enabling the source endpoint device to use one of the alias IP addresses for communicating with the endpoint device via the corresponding IP address realm; and receiving by the endpoint device second queries from the source endpoint device for at least two of the alias IP addresses, respectively, each second query including the second unique identifier;

selecting by the endpoint device, from the received second queries, the one alias IP address to be used by the source endpoint device for communications with the endpoint device; and sending by the endpoint device a reply for the second queries to the source endpoint device that includes the first unique identifier, and the one alias IP address to be used by the source endpoint device.

5. The method of claim 4, wherein the selecting includes validating each of the second queries based on detecting in each of the second queries the corresponding second unique identifier, wherein the second unique identifier is a private key that can be decoded only by the endpoint device.

6. The method of claim 4, wherein each of the received second queries includes an alias used identifier that specifies the corresponding alias IP address being queried as a candidate destination, the selecting including selecting the one alias IP address specified in the corresponding received alias used identifier and having a highest relative preference, relative to the alias IP addresses output in the response and having respective preferences based on a determined network topology of the respective IP address realms.

7. The method of claim 4, further including receiving IP datagrams from the source endpoint device having the one alias IP address specified within an IP destination address field of the IP datagrams.

8. An endpoint device having a first Internet Protocol (IP) network address for use in a first IP address realm of a local IP network, the local IP network including a network address translator configured for converting the first IP network address to a second IP address for a second address realm, the endpoint device including:

means for sending a query to a destination endpoint device, the query having an IP source address field specifying the first IP network address and an IP destination address field specifying an available IP address for the destination endpoint device having a value outside the first IP address realm, the query specifying a first unique identifier identifiable solely by the endpoint device for validating any received reply to the query;

means for receiving a response from the destination endpoint device that specifies the first unique identifier, a second unique identifier used for responding to the destination endpoint device, and alias IP addresses for reaching the destination endpoint device via the respective IP address realms, the alias IP addresses including at least the available IP address for the destination endpoint device and an alternate IP address; and means for using one of the alias IP addresses for communicating with the destination endpoint device via the corresponding IP address realm, including inserting the one alias IP address in the corresponding IP destination address field of each IP datagram destined for the destination endpoint device;

wherein the means for sending is configured for sending a second query for each of the alias IP addresses, each second query including the second unique identifier, the means for using configured for selecting the one alias IP address based on receiving a reply specifying, by the destination endpoint device, preferred use of the one alias IP address relative to the alias IP addresses specified in the respective second queries received by the destination endpoint device.

9. The endpoint device of claim 8, wherein the means for using is configured for validating the reply based on detecting the first unique identifier.

10. The endpoint device of claim 8, wherein the means for sending is configured for inserting, within each second query, an alias used identifier that specifies the corresponding alias IP address being queried as a candidate destination.

11. An endpoint device having a first Internet Protocol (IP) network address for use in a first IP address realm of a local IP network, the local IP network including a network address translator configured for converting the first IP network address to a second IP address for a second IP address realm, the endpoint device including:

means for determining alias IP addresses used by the respective IP address realms for identifying the endpoint device, including at least the first IP network address and the second IP address;

means for receiving a query from a source endpoint device, the query specifying a first unique identifier used for responding to the source endpoint device; and means for outputting a response to the source endpoint device that specifies the first unique identifier, a second unique identifier identifiable solely by the endpoint device, and the alias IP addresses usable for reaching the endpoint device via the respective IP address realms, the response enabling the source endpoint device to use one of the alias IP addresses for communicating with the endpoint device via the corresponding IP address realm, wherein:

the means for receiving is configured for receiving second queries from the source endpoint device for at least two of the alias IP addresses, respectively, each second query including the second unique identifier;

the means for outputting is configured for selecting, from the received second queries, the one alias IP address to be used by the source endpoint device for communications with the endpoint device; and the means for outputting is configured for sending a reply for the second queries to the source endpoint device that includes the first unique identifier, and the one alias IP address to be used by the source endpoint device.

12. The endpoint device of claim 11, wherein the means for outputting is configured for validating each of the second queries based on detecting in each of the second queries the corresponding second unique identifier, wherein the second unique identifier is a private key that can be decoded only by the endpoint device.

13. The endpoint device of claim 11, wherein each of the received second queries includes an alias used identifier that specifies the corresponding alias IP address being queried as a candidate destination, the means for outputting configured for selecting the one alias IP address specified in the corresponding received alias used identifier and having a highest relative preference, relative to the alias IP addresses output in the response and having respective preferences based on a determined network topology of the respective IP address realms.

14. The endpoint device of claim 11, wherein the means for receiving is configured for receiving IP datagrams from the source endpoint device having the one alias IP address specified within an IP destination address field of the IP datagrams.

15. An endpoint device having a first Internet Protocol (IP) network address for use in a first IP address realm of a local IP network, the local IP network including a network address translator configured for converting the first IP network address to a second IP address for a second IP address realm, the endpoint device including:
 a query resource configured for sending a query to a destination endpoint device, the query having an IP source address field specifying the first IP network address and an IP destination address field specifying an available IP address for the destination endpoint device having a value outside the first IP address realm, the query specifying a first unique identifier identifiable solely by the endpoint device for validating any received reply to the query;
 an interface configured for receiving a response from the destination endpoint device that specifies the first unique identifier, a second unique identifier used for responding to the destination endpoint device, and alias IP addresses for reaching the destination endpoint device via the respective IP address realms, the alias IP addresses including at least the available IP address for the destination endpoint device and an alternate IP address; and
 an optimizer resource configured for using one of the alias IP addresses for communicating with the destination endpoint device via the corresponding IP address realm, including inserting the one alias IP address in the corresponding IP destination address field of each IP datagram destined for the destination endpoint device;
 wherein the optimizer resource is configured for sending a second query for each of the alias IP addresses, each second query including the second unique identifier, the optimizer resource configured for selecting the one alias IP address based on receiving a reply specifying, by the destination endpoint device, preferred use of the one alias IP address relative to the alias IP addresses specified in the respective second queries received by the destination endpoint device.

16. The endpoint device of claim 15, wherein the optimizer resource is configured for validating the reply based on detecting the first unique identifier.

17. The endpoint device of claim 15, wherein the optimizer resource configured for inserting, within each second query, an alias used identifier that specifies the corresponding alias IP address being queried as a candidate destination.

18. An endpoint device having a first Internet Protocol (IP) network address for use in a first IP address realm of a local IP network, the local IP network including a network address translator configured for converting the first IP network address to a second IP address for a second IP address realm, the endpoint device including:
 a discovery resource configured for determining alias IP addresses used by the respective IP address realms for identifying the endpoint device, including at least the first IP network address and the second IP address; and
 an interface configured for receiving a query from a source endpoint device, the query specifying a first unique identifier used for responding to the source endpoint device; and
 an optimizer resource configured for outputting a response to the source endpoint device that specifies the first unique identifier, a second unique identifier identifiable solely by the endpoint device, and the alias IP addresses usable for reaching the endpoint device via the respective IP address realms, the response enabling the source endpoint device to use one of the alias IP addresses for communicating with the endpoint device via the corresponding IP address realm, wherein:
 the interface is configured for receiving second queries from the source endpoint device for at least two of the alias IP addresses, respectively, each second query including the second unique identifier;
 the optimizer resource is configured for selecting, from the received second queries, the one alias IP address to be used by the source endpoint device for communications with the endpoint device, and sending a reply for the second queries to the source endpoint device that includes the first unique identifier, and the one alias IP address to be used by the source endpoint device.

19. The endpoint device of claim 18, wherein the optimizer resource is configured for validating each of the second queries based on detecting in each of the second queries the corresponding second unique identifier, wherein the second unique identifier is a private key that can be decoded only by the endpoint device.

20. The endpoint device of claim 18, wherein each of the received second queries includes an alias used identifier that specifies the corresponding alias IP address being queried as a candidate destination, the optimizer resource configured for selecting the one alias IP address specified in the corresponding received alias used identifier and having a highest relative preference, relative to the alias IP addresses output in the response and having respective preferences based on a determined network topology of the respective IP address realms.

21. The endpoint device of claim 18, wherein the interface is configured for receiving IP datagrams from the source endpoint device having the one alias IP address specified within an IP destination address field of the IP datagrams.

22. The method of claim 1, wherein the first unique identifier is a private key that can be decoded only by the endpoint device.

23. The device of claim 8, wherein the first unique identifier is a private key that can be decoded only by the endpoint device.

24. The device of claim 15, wherein the first unique identifier is a private key that can be decoded only by the endpoint device.

* * * * *